United States Patent Office 3,424,827
Patented Jan. 28, 1969

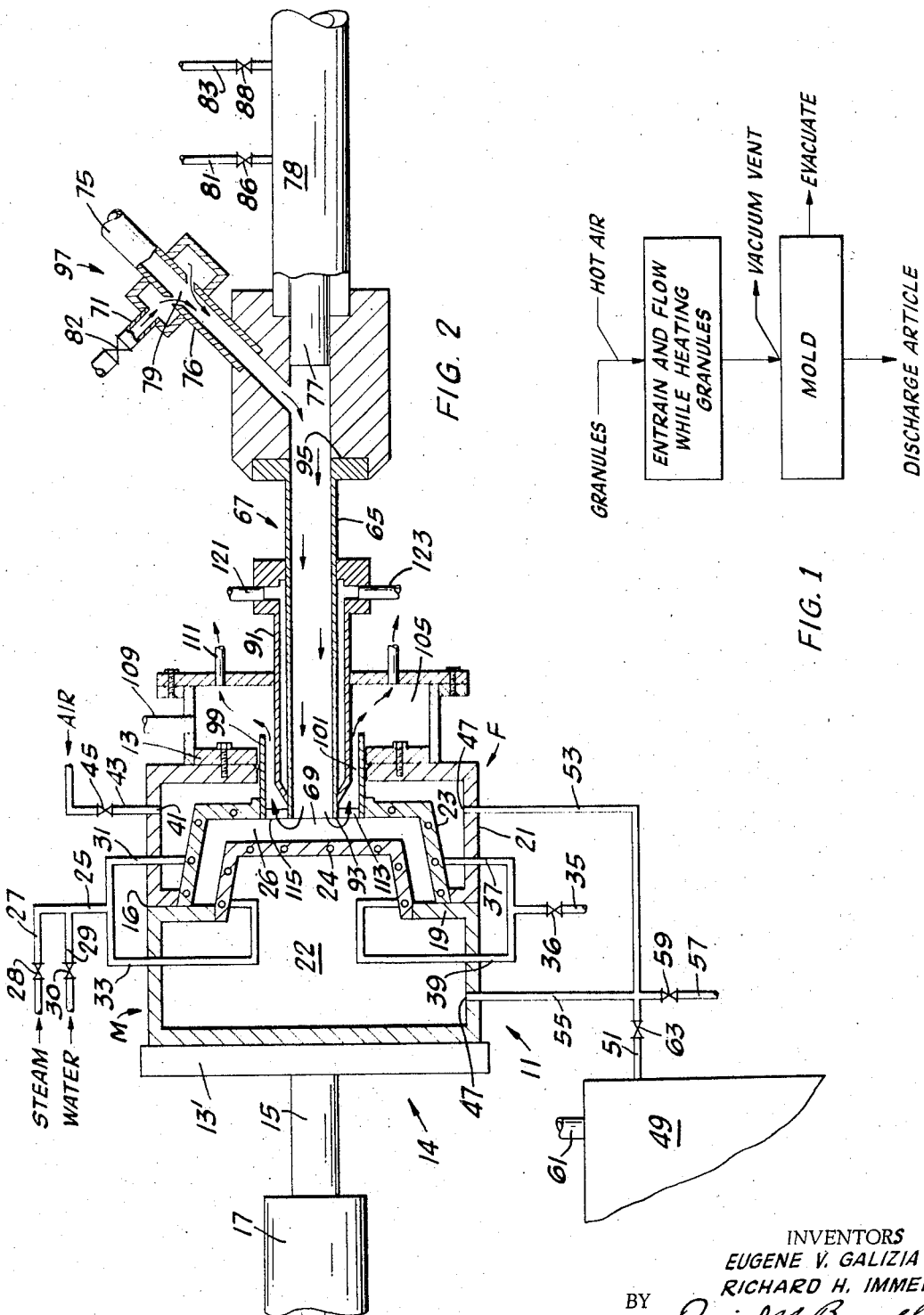

3,424,827
PROCESS AND APPARATUS FOR MAKING SHAPED CELLULAR ARTICLES FROM EXPANDABLE THERMOPLASTIC RESINS
Eugene V. Galizia, Zelienople, and Richard H. Immel, Sewickley, Pa., assignors to Sinclair-Koppers Company, a partnership of Delaware
Filed Oct. 10, 1966, Ser. No. 585,603
U.S. Cl. 264—51                 6 Claims
Int. Cl. B29d 27/04

ABSTRACT OF THE DISCLOSURE

A method and apparatus are provided for the rapid forming of shaped cellular articles from expandable granules of a thermoplastic resin, through the use of a blow fill tube for introducing the beads into the mold cavity, an air cylinder and piston to control the flow of beads, and a vent tube and vent sleeve to keep back pressure from building up in the mold cavity.

This invention relates generally to the forming of shaped articles from granules of a thermoplasttic material and, more particularly, to the rapid forming of shaped cellular articles from expandable granules of a thermoplastic resin, and as such is an improvement over U.S. 3,278,658. United States Patent No. 3,278,658, describes the vacuum molding of a foamed polystyrene article by filling of a mold with expandable polymeric beads, which have been previously partially expanded, using hot air as the conveying means. The partially expanded beads are heated by the air as they are conveyed into the mold. When a vacuum is drawn in the mold cavity, the heated beads expand and fuse together. Reference is made to the aforesaid patent for further description.

It has been found that in the molding of the articles, the conventional blow filling equipment normally utilized with the well-known steam molding process is not entirely satisfactory.

During the mold filling phase of the cycle, the mold parting line is generally held open, for example, about 0.025 inch, to allow the blow fill air to vent and to carry the expandable polymeric beads to the extremities of the mold cavity without causing any back pressure within the cavity. Back pressure, of course, results in an incomplete fill. In the normal filling operation, air continues to vent through the beads and out the parting line until the mold cavity is completely full. In the vacuum molding process of the aforesaid patent, however, the beads are soft and tacky due to being heated as they are conveyed into the mold. As the beads are partially compressed at the parting line due to the air pressure, a partial seal at the parting line is effected which prevents the necessary venting of the blow fill air. A back pressure is created within the mold cavity which results in an incomplete fill.

It has now been found, in accordance with this invention, that the problem discussed above can be overcome by venting the mold at the blow fill tube where the beads are introduced into the mold. In accordance with this invention, a blow fill tube is provided for introducing the beads into the mold cavity, an air cylinder and piston controls the flow of beads, and a vent tube and vent sleeve to keep back pressure from building up in the mold cavity.

The above and further objects and novel features of the invention will appear more fully from the detailed description when the same is read in conjunction with the accompanying drawings. It is to be expressly understood, however, that the drawings are not intended to be a definition of the invention but are for the purpose of illustration only.

FIG. 1 is a flow diagram of the process; and
FIG. 2 is a highly schematic vertical cross-section of an embodiment of the novel apparatus.

As illustrated schematically in the flow diagram of FIG. 1, the expandable polymeric granules are entrained in hot air and flowed to the mold. The expandable granules are heated during the flow to a temperature above the softening point of the thermoplastic material but below the temperature where substantial expansion takes place and before expansion occurs. The particles enter a mold cavity that essentially defines the shape of the finished article, and are there subjected to a vacuum whereupon the granules expand, coalesce, and fuse together to form a shaped, foamed, cellular mass. Then the mass is cooled to a self-sustaining surface temperature and is removed from the mold as a finished article having a foamed structure of uniform density.

The mold 11 as illustrated in FIG. 2 is constructed as two sections, a male mold section M and a female mold section F. These sections are held in place in press 14 between platens 13 and 13'. Platens 13 for the female section is fixed and platen 13' for the male section is movable toward and away from platen 13 by means of rod 15 which is actuated by cylinder 17, so that the mold can be opened and closed. Part line 16 is formed in mold 11 where the halves of mold 11 come together.

Mold 11 has an outer solid metal shell 21 and an inner perforated metal shell 23 connected to outer shell 21 by support portion 19. The inner shell defines a mold cavity 26 and the inner and outer shells define a chest 22.

Inner shell 23 contains imbedded coils 24 which are connected to sources of steam and water through lines 25, 27 and 29 and connections 31 and flexible connection 33. The flow of steam is controlled by valve 28 in line 27 and the flow of water is controlled by valve 30 in line 29. Coils 24 are connected to a drain line 35 by connection 37 and flexible connection 39. Drain line 35 can be closed by valve 36.

Outer shell 21 has an inlet 41 for compressed air connected to a source of compressed air by means of line 43, said air being controlled by valve 45, and ports 47 connected to vacuum tank 49 by means of line 51, connection 53 and flexible connection 55. Line 51 has a bleed line 57 for atmospheric air controlled by valve 59. Vacuum tank 49 can be isolated from mold 11 by closing valve 63 located in line 51 and is connected to a conventional vacuum source through line 61.

The polymeric particles are fed to the mold cavity 26 by way of an inlet pipe 65 of blow fill tube 67 which passes through outer shell 21 to bead inlet 69 in inner shell 23. Aspirator 76 is connected to inlet pipe 65 of blow fill tube 67. Pipes 71 and 75 are connected to aspirator 76 so that a venturi chamber is formed at 79. Pipe 71 is connected to a source of hot air under pressure and pipe 75 is connected to a container for granular polymeric material. Inlet pipe 65 is fitted with a piston 77 of suitable size and shape to close off bead inlet 69 which is actuated by a standard hydraulic ram 78. The flow of air through line 71, and lines 81 and 83 of hydraulic ram 78 controlled by conventional solenoid valves 82, 86 and 88. The valves are operated through a conventional time control mechanism.

In practice, mold 11 is closed by platen 13' and rod 15 which is actuated by cylinder 17. Valve 36 on drain line 35 is closed and valve 28 to the steam supply which has a pressure of between 40 and 50 p.s.i.g. is opened to fill coils 24 with steam and preheat inner mold shell 23 to between 200 and 230° F. Then valve 28 is closed and drain valve 36 is opened. Mold 11 is now in closed position. Hot air at a temperature of from 400° to 750° F. and a pressure of from 15 to 70 p.s.i.g. is delivered by line 71 to aspirator 76 of blow fill tube 67 sucking granules through line 75 from a container in which the granules have been previously heated to a temperature of from 150 to 170° F. The granules are entrained in the hot air and heated from 5 to 10° F. above the softening point of the polymer but below the point at which substantial expansion of the granules occurs while they are carried through pipe 65 to bead inlet 69 into mold cavity 26. The hot air is vented from cavity 26 through perforated shell 23 to chest 22 and out through connections 53 and 55 to bleed line 57 where it is vented to the atmosphere, valve 59 being opened and valve 63 being closed. When mold cavity 26 becomes filled, back pressure is created in pipe 65 causing the air temperature to rise. After a predetermined time, valve 82 is actuated closing off hot air line 71. Valve 88 on line 83 of hydraulic ram 78 is then activated causing piston 77 to close bead inlet 69. When bead inlet 69 is closed, valve 59 on atmospheric bleed line 57 is closed and valve 63 in pipe 51 leading to vacuum tank 49 is opened causing a sudden vacuum of from 28 to 30 inches of mercury inside mold 11 which results in expansion and fusion of the beads in mold cavity 26 to conform to the shape of mold shell 23. Valve 63 is then closed and valve 59 opened to allow the mold to return to atmospheric pressure. Drain valve 36 is opened and water valve 30 is opened to circulate water at a temperature of from 40 to 50° F. to coils 24 and cool inner shell 23 to a temperature of 150° to 180° F. Rod 15 is then actuated by cylinder 17 to open mold 11. Valve 45 in ejection air line 43 is opened so that the air pressure causes the finished article to be ejected from mold shell 23.

The particles being soft and tacky due to their temperature tend to be partially compressed at the parting line due to the air pressure by which the particles are fed to the mold cavity. A partial seal is thus efficient at the part line and this destroys the venting at the part line. A back pressure is created in the cavity and it prevents the cavity 26 from being filled with particles. In accordance with this invention, the mold cavity 26 of mold 11 is vented at the bead inlet 69 into the mold 11 by way of an annular space between a sleeve 91 and vent sleeve 99 thus preventing any build up of back pressure.

Referring now to FIG. 2, the apparatus for molding articles of foamed polymeric structure from expandable polymeric particles is illustrated as being the mold 11 having the mold walls 23 leaving a cavity 26 therebetween. A pipe 65 has an end 93 discharging into the mold cavity 26 and an end 95 receiving an entrainment of expandable polymeric particles in hot air from a mixer 97. Surrounding pipe 65 is a vent sleeve 99 which, of course, is larger than the pipe 65 providing an annular space 101 between the pipe 65 and the sleeve 99. This sleeve 99 communicates with a vent and vacuum chamber 105 to which is subjected a vacuum or vent by way of conduits 109 and 111. The vent sleeve 99 connects the mold cavity wall 23 and the pipe 65 by way of a connecting means 113. This connecting means is perforated at 115 so that any build up of pressure in the mold cavity 26 is withdrawn into chamber 105 and out conduits 109 and 111. Conduits 111 which are open to the atmosphere are provided with check valves (not shown) which close when the cavity 26 is evacuated to fuse the particles. Thus, the removal of air during the filling of the mold presents a pressure build up in the cavity and assures the complete filling of the mold cavity.

In the annular space 101 between the pipe 65 and the vent sleeve 99 is a further sleeve 91. This sleeve is connected by way of line 121 to a suitable source of steam which steam exits by way of line 123. Thus, the pipe 65 which carries the entrainment of particles in hot air is surrounded by steam so that no heat is lost as the entrainment passes through the pipe.

The mixer for providing the entrainment of the expandable polymeric particles in air is illustrated as a venturi or aspirator 76. To this end, hot air under pressure passes through conduit 71 into sleeve 135 and out through the aspirating venturi 76 into duct 139 and thence into blow fill tube 67. The pipe 75 is connected to a source of expandable polymeric material. Thus, as the air passes into the venturi chamber 79 it sucks the polymeric material into duct 139 and forms an entrainment.

For control of the entrainment into the mold, there is provided a piston 77 which is controlled by a conventional air cylinder 78. The piston can completely block the entrance of air and entrance of entrainment into the tube 67 and close the entrance 69 to mold cavity 26 or it can be moved to allow flow of entrainment at some desired rate into the mold cavity 26.

Either virgin polymer beads (beads which have not been expanded), or pre-expanded beads (beads which have been partially expanded as, for example, described in United States Patent No. 3,023,175) can be fed to the mold cavity 26. Advantageously the beads are held in a storage container maintained at a temperature of from 140 to 170° F. so that they can be quickly heated to fusion temperature while being carried into the mold by the hot air. The hot air is delivered to the venturi section of the blow fill tube under a pressure of from 15 to 70 p.s.i.g. as necessary depending on the efficiency of the venturi. The temperature required for the compressed hot air will depend upon its pressure since the temperature will drop adiabatically with the sudden pressure drop when the air enters the venturi section. The temperature of the compressed hot air is adjusted to heat the polymer beads being carried into the mold to a temperature of from 5–10° F. above their softening point. A compressed hot air temperature of 400° F. at pressure of 15 p.s.i.g. will give a hot air blow tube discharge temperature of approximately 270°–300° F. at a pressure of 1 to 3 p.s.i.g. which is sufficient to heat the polymer beads to between 190 and 210° F. It has been found that at a hot air pressure of 70 p.s.i.g., a hot air temperature source of 750° F. is necessary to achieve a hot air blow fill tube discharge temperature of 300° F. at 3 p.s.i.g. One skilled in the art can readily determine at hot air pressures of between 15 and 70 p.s.i.g., the appropriate air temperature to give the desired blow tube discharge temperature. It should be realized that any substantially dry inert gas can be used besides air, for example, nitrogen.

Expandable polymers suitable for use in making cellular articles in accordance with this invention include a variety of homopolymers and copolymers derived from vinyl monomers including styrene, vinyl chloride, divinylbenzene, alpha-methyl styrene, nuclear dimethyl styrenes, vinyl naphthalene, etc. Particular polymers that are useful are polystyrene and its copolymers with such monomers as butadiene, alpha-methyl styrene, divinylbenzene, isobutylene and acrylonitrile. These expandable materials have incorporated therein as a propellant a volatile organic fluid in an amount of from 3 to 35 parts by weight of the polymer such as saturated aliphatic hydrocarbons containing from 4–7 carbon atoms in the molecule, for example, butane, pentane, hexane, heptane, cyclohexane or halogenated derivatives of methane and ethane which boil below 95° C. Other suitable propellants include water or a combination of chemicals which will evolve a gas such as carbon dioxide, water vapor or nitrogen when heated to a temperature at or below the softening point of the polymer, for example, sodium bicarbonate and citric acid.

We claim:

1. A method of forming a shaped foamed cellular thermoplastic article from partially expanded granules of an expandable thermoplastic material comprising, flowing particles with a substantially dry heated gaseous medium into a mold space that defines the shape of said article so that said granules enter said space at a temperature above the softening point of the thermoplastic material but below the temperature where substantial expansion takes place, applying a venting vacuum adjacent the introduction of said beads to prevent pressure build-up in said space, thereafter subjecting said granules in said space without further heating to a vacuum to expand and fuse said granules together to form said foamed cellular plastic article conforming to the shape of said space, and then removing the article from said space.

2. A method of forming a shaped formed cellular thermoplastic article comprising forming an entrainment of granules of an expandable thermoplastic material in a substantially dry heated gaseous media to heat said granules to a temperature above the softening point of the thermoplastic material but below the temperature where substantial expansion takes place flowing said entrainment into a space that defines the shape of said article whereby the granules enter said space in a heated condition and no substantial temperature gradient is encountered, vacuum venting said space adjacent the flow of material into said space to prevent pressure build-up in said space, thereafter subjecting said granules in said space without further heating to a vacuum to expand and fuse said granules together to form said foamed cellular plastic article conforming to the shape of said space, and then removing the article from said space.

3. Apparatus for molding articles of foamed polymeric structure from expandable polymeric granules comprising:
   a mold having a cavity;
   a mixer for entraining said granules in a substantially dry heated gaseous medium;
   a tube having one end discharging into said mold cavity and an opposite end for receiving said entrainment of granules in air for conducting said entrainment to said cavity;
   a vent sleeve surrounding said tube to provide an annular space for the application of a vacuum;
   a vacuum source; and
   connecting means connecting said vent sleeve to said mold and said vacuum source for removing air from said mold cavity through said annular space to eliminate pressure build-up in said cavity.

4. The apparatus of claim 1 wherein heating means is provided for said tube to avoid loss of heat to said tube by said entrainment.

5. The apparatus of claim 1 in which said mixer comprises an aspirator, a supply of hot air under pressure, means connecting said supply of hot air under pressure to said aspirator, and means connecting said aspirator with a source of expandable polymeric granules.

6. An apparatus for forming a shaped foamed cellular thermoplastic article comprising means for forming an entrainment of granules of an expandable thermoplastic material in a substantially dry heated gaseous media to heat said granules to a temperature above the softening point of the thermoplastic material but below the temperature where substantial expansion takes place, means for flowing said entrainment into a preheated mold that defines the shape of said article whereby the granules enter said mold in a heated condition and no substantial temperature gradient is encountered, means for vacuum venting said mold adjacent to the flow of material into said mold to prevent pressure build-up in said mold, and means for thereafter subjecting said granules in said mold to a vacuum to expand and fuse said granules together to form a cellular plastic article conforming to said mold.

References Cited

UNITED STATES PATENTS

| | | | |
|---|---|---|---|
| 3,028,625 | 4/1962 | Dawson | 18—5 |
| 3,125,780 | 3/1964 | Harrison et al. | 18—30 XR |
| 3,139,466 | 6/1964 | Couchman | 264—53 XR |
| 3,278,658 | 10/1966 | Immel | 264—51 |
| 3,280,472 | 10/1966 | Lorenian | 264—51 XR |

DONALD J. ARNOLD, *Primary Examiner.*

P. E. ANDERSON, *Assistant Examiner.*

U.S. Cl. X.R.

264—91; 18—5

UNITED STATES PATENT OFFICE
CERTIFICATE OF CORRECTION

Patent No. 3,424,827                        January 28, 1969

Eugene V. Galizia et al.

It is certified that error appears in the above identified patent and that said Letters Patent are hereby corrected as shown below:

Column 5, line 38, and column 6, line 3, claim reference numeral "1", each occurrence, should read -- 3 --.

Signed and sealed this 14th day of April 1970.

(SEAL)

Attest:

Edward M. Fletcher, Jr.                WILLIAM E. SCHUYLER, JR.

Attesting Officer                        Commissioner of Patents